(12) United States Patent
Coker et al.

(10) Patent No.: US 8,913,335 B2
(45) Date of Patent: Dec. 16, 2014

(54) STORAGE DEVICE WITH SHINGLED DATA AND UNSHINGLED CACHE REGIONS

(75) Inventors: Jonathan Darrel Coker, Rochester, MN (US); David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 472 days.

(21) Appl. No.: 13/135,953

(22) Filed: Jul. 18, 2011

(65) Prior Publication Data

US 2012/0300328 A1   Nov. 29, 2012

Related U.S. Application Data

(60) Provisional application No. 61/489,174, filed on May 23, 2011.

(51) Int. Cl.
  *G11B 5/09* (2006.01)
  *G11B 5/012* (2006.01)
  *G11B 5/82* (2006.01)

(52) U.S. Cl.
  CPC .................................... *G11B 5/012* (2013.01)
  USPC ........................................... 360/48; 360/135

(58) Field of Classification Search
  None
  See application file for complete search history.

(56) References Cited

U.S. PATENT DOCUMENTS

| | | | |
|---|---|---|---|
| 6,185,063 B1 | 2/2001 | Cameron | |
| 6,378,037 B1 * | 4/2002 | Hall | 711/113 |
| 6,556,369 B1 * | 4/2003 | Kanamaru et al. | 360/75 |
| 6,967,810 B2 | 11/2005 | Kasiraj | |
| 2005/0071537 A1 | 3/2005 | New | |
| 2006/0209452 A1 * | 9/2006 | Sado et al. | 360/76 |
| 2006/0232874 A1 * | 10/2006 | Tsuchinaga et al. | 360/75 |
| 2007/0183071 A1 | 8/2007 | Uemura | |
| 2008/0304172 A1 * | 12/2008 | Bi et al. | 360/48 |
| 2010/0205623 A1 | 8/2010 | Molaro | |
| 2010/0232057 A1 | 9/2010 | Sanvido | |
| 2011/0058277 A1 | 3/2011 | de la Fuente et al. | |
| 2011/0292538 A1 * | 12/2011 | Haga et al. | 360/60 |

OTHER PUBLICATIONS

Yuval Cassuto, et al.; Indirection Systems for Shingled-Recording Disk Drives; 26th IEEE (MSST2010) Symposium on Massive Storage Systems and Technologies; May 7, 2010 http://storageconference.org/2010/Presentations/Research/15.Cassuto.pdf 44 pages.

Ikuya Tagawa, et al.; Minimization of erase-band in shingled PMR with asymmetric writer; Journal of Magnetism and Magnetic Materials; No vol. or page given; online Dec. 2, 2010 in ScienceDirect. 3 pages.

Ahmed Amer, et al.; Design Issues for a Shingled Write Disk System; 26th IEEE (MSST 2010) Symposium on Massive Storage Systems and Technologies: Research Track; May 7, 2010 http://storageconference.org/2010/Papers/MSST/Amer.pdf . 12 pages.

* cited by examiner

*Primary Examiner* — Daniell L Negron
(74) *Attorney, Agent, or Firm* — G. Marlin Knight

(57) ABSTRACT

Shingled magnetic recording (SMR) devices according to embodiments of the invention include unshingled cache regions that can be used for storage of data. The unshingled cache regions can be used in a variety of flexible ways including in an implementation of write-twice caching or for opportunistic temporary storage to improve performance. The cache regions can be offset between top and bottom surfaces of the disk and staggered between disks to provide shorter seek times to the nearest cache region. Embodiments of the invention are adapted for use with symmetric or asymmetric heads.

9 Claims, 4 Drawing Sheets

STORAGE DEVICE WITH SHINGLED DATA AND UNSHINGLED CACHE REGIONS

RELATED APPLICATIONS

This application is related to provision patent application filed on May 23, 2011 bearing Ser. No. 61/489,174 and the benefits of this provisional application are claimed under 35 U.S.C. 119(e).

FIELD OF THE INVENTION

The invention relates to the field of data storage device architecture for shingle-written magnetic recording (SMR).

BACKGROUND

Conventional disk drives with magnetic media organize data in concentric tracks. The concept of shingled writing is a form of perpendicular magnetic recording and has been proposed as a way of increasing the areal density of magnetic recording. In shingle-written magnetic recording (SMR) media a region (band) of adjacent tracks are written so as to overlap one or more previously written tracks. Unlike conventional tracks, which can be written in any order, the shingled tracks must be written in sequence. The tracks on an SMR disk surface are organized into a plurality of shingled regions (typically called I-regions) which can be written sequentially from an inner diameter (ID) to an outer diameter (OD) or from OD to ID. The number of tracks shingled together in a region is a key performance parameter of shingled-writing. Once written in shingled structure, an individual track cannot be updated in place, because that would overwrite and, thereby, destroy the data in overlapping tracks. Shingle-written data track regions, therefore, from the user's viewpoint are sometimes thought of as append-only logs. To improve the performance of SMR drives, a portion of the media is allocated to a so-called "exception region" (E-region) which is used as staging area for data which will ultimately be written to an I-region.

Because a portion of the previously written track is overwritten during writing of the adjacent track, SMR heads write a wider path than the final actual track width. Therefore, most of the write path is erased when the overlapping track is subsequently written. These unique aspects of SMR have led to the development of special write heads for SMR. One example is an asymmetric write head for shingled magnetic recording described in published US patent application 20110058277 by Anton de la Fuente, et al. (Mar. 10, 2011).

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or something closer to a physical address.

The conventional LBA-PBA mapping for defects does not need to be changed often. In contrast, in an SMR device the physical block address (PBA) of a logical block address (LBA) can change depending on write-history. For example, background processes such as garbage collection move data sectors from one PBA to another but the LBA stays the same. The indirection system for SMR is a natively dynamic system in which the controller translates host address requests to physical locations. In an SMR system, the LBA-PBA mapping changes with every write operation because the system dynamically determines the physical location on the media where the host data for an LBA will be written. The same LBA will be written to a different location the next time the host LBA is updated. The indirection system provides a dynamic translation layer between host LBAs and the current physical locations on the media.

Write caching is a method used to avoid forcing a host computer to wait while a write command is performed on relatively slow non-volatile storage, such as disk drive. One way of freeing the host from waiting is to temporarily place the data for the write command in a volatile RAM cache and send a write confirmation message to the host even though the data has not actually been written yet. In normal operation, the device will eventually write the data from the cache to nonvolatile media. This method has obvious flaws that can lead to data loss under abnormal conditions.

Prior art methods of handling disk drive RAM caches provide solutions to power loss problems. In U.S. Pat. No. 6,378,037 to Hall (Apr. 23, 2002) fail-safe write-caching uses specially arranged portions of a disk surface to store write cache data during drive idle time. In case of a system or power failure before the data is written to its ultimate disk destination, the data can be read from the specially arranged portions to effect recovery without data loss. The design uses a "dual" or "split" actuator embodiment and does not include embodiments for SMR. The time between when the head mechanism has arrived over the correct cylinder (seek) and when the correct location on the track is reached (latency) is used to write portions of the write cache to the disk in special blocks, referred to as Write-Twice Cache Blocks (cacheB). Each cacheB holds: one block of data from the write cache, the data destination address, a time stamp which uniquely identifies the block of data as the latest entry, and a list of which cacheBs contain write cache information which has not yet been written to the respective ultimate destination. The cacheBs can be spaced around the track or instead, multiple cylinders can be used, requiring that short seeks (one or two cylinders) be performed to write some cacheBs.

SUMMARY OF THE INVENTION

Shingled magnetic recording (SMR) devices according to embodiments of the invention include unshingled cache regions that can be used for efficient storage of data. The unshingled cache regions can be used in a variety of flexible ways including in an implementation of write-twice caching. It is also possible for the device to use the cache regions independent of write caching for opportunistic temporary storage of selected LBAs to improve performance. One alternative use for the cache regions is as a "hot cache" for data that is frequently written, i.e. hot data.

The unshingled cache regions are organized in concentric bands that are spaced at selected radial positions on the disk media between bands of shingled recording regions (I-regions) where most user data is stored. The locations for the unshingled cache regions can be predetermined, but in alternative embodiments cache regions can be dynamically created to improve performance under certain conditions, for example, to take advantage of otherwise free or unused space on the device. Guard bands or regions are used to separate the shingled data regions and the unshingled cache regions, as well to separate shingled data I-regions. The organization of the disk surface according to the invention is implemented using disks with continuous thin film coatings and does not require physical patterning.

Embodiments of the invention adjust the relative positions of the cache bands on the various disk surfaces and the writing direction for the shingled data areas. The cache regions can be offset between top and bottom surfaces of the disk and staggered between disks to provide shorter seek times to the nearest cache track. Embodiments of the invention are adapted for use with symmetric or asymmetric heads.

DETAILED DESCRIPTION OF THE INVENTION

Figure 1:
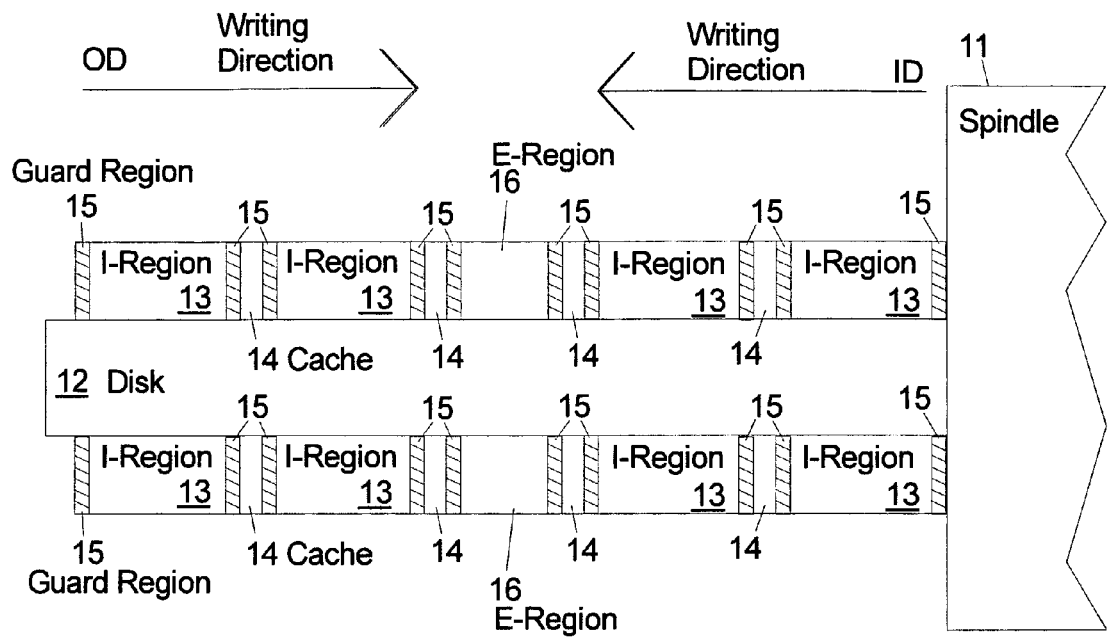
FIG. 1 is an illustration of a section view through the center of a disk in a data storage device with interspersed cache regions and shingled data regions according to an embodiment the invention where the writing direction is from OD to ID for the outer regions and ID to OD for the inner regions.

The invention can be implemented in a design with a single actuator, so it is not necessary to use a dual or split actuator as described in U.S. Pat. No. 6,378,037 mentioned above. FIG. 1 is an illustration of a cutaway view of disk 12 attached to spindle 11 in an SMR data storage device showing interspersed unshingled cache regions 14 and shingled I-regions 13 according to an embodiment the invention. The E-regions 16 can either be shingled or unshingled tracks. The I-regions 13 and E-regions 16 are used according to the prior art except as otherwise described herein. The E-regions in SMR drives are generally used as a temporary staging area for data. The bulk of the device's storage space is allocated to the shingled I-regions 13. Typically new write data is temporarily written to an E-region and then a background storage management task is responsible for moving the data to a shingled I-region at an appropriate time. The background storage management task is also responsible for doing defragmentation-type data management. The E-regions are sometimes referred to as E-caches in the literature, but should not be confused with the cache regions 14 according to the invention.

The cache regions 14, E-regions 16 and I-regions 13 are shown only in section view in the figures, but they are concentric circular bands that extend 360 degrees around the surface of the disk. All of the regions are magnetically formed/written as concentric tracks in generally homogeneous thin film magnetic material on the planar surfaces of the disk. In this embodiment the cache regions are aligned on the upper and bottom surfaces of the disk.

Only a few cache regions are shown, but the actual number of cache regions can be much larger in embodiments of the invention. The number of cache regions should be much higher than the number of E-regions, and generally the E-regions will be much larger than the cache regions. A higher number of cache regions reduces the seek time needed for the head to get to the nearest cache region, but the design trade-off is that increased disk space is taken away from the user data regions.

A design goal for the cache regions is to provide areas on the media where the device can quickly store data in nonvolatile form with nonsequential writing which allows low system overhead. In contrast writing to an E-region generally requires sequential writes and higher system overhead for defragmentation, etc. E-regions will generally hold data for a longer period of time than the cache regions depending on factors such as how long it takes to defragment an I-region.

For increased performance the cache regions should be sparsely populated, so they can be written soon after the head settles onto a track after seeking from another location. With the exception of the "hot cache" alternative embodiment, the cache regions are generally temporary storage until writing to the E-region occurs based on the drive's caching algorithms. For example, writing to the E-region might occur when sufficient commands/data accumulate to make the per-command execution cost of writing in the E-region minimal.

In embodiments of the invention the cache regions are generally created at predetermined locations as a part of the process of formatting the disks during the manufacturing process. However, in alternative embodiments cache regions can be dynamically created to improve performance under certain conditions, for example, to take advantage of otherwise free or unused space on the device. The dynamically created cache regions can also be removed as needed to allow the media space to be used for shingled data regions.

As indicated by the writing direction arrows, the writing direction in the embodiment shown in FIG. 1 for the shingled data I-regions is from OD to ID for the outer regions and ID to OD for the inner regions. This configuration is suited for use with symmetric heads that can be used to write shingled tracks in either direction.

The guard bands or regions 15 are used at each transition between shingled data tracks to unshingled tracks. A guard region 15 can be the width of a single data track or two or more data tracks, and it is used to avoid data overwrites as SMR write heads are wider than data tracks. Each guard region is a set number of data tracks wide, whether located at the inner diameter to outer diameter of the disk. However, the required width for each guard region changes across the radius of disk due to changes in the angle of the head from the mechanical rotation of head (slider) around the pivot point of the actuator. Thus, the necessary distance required for the guard band at the inner diameter might be wider than at the outer diameter or middle diameter. Guard bands are virtual structures from a read/write standpoint, i.e. no corresponding physical structure is needed in the thin film magnetic material. The device's firmware ensures that the guard bands are not written by reserving selected regions on each disk surface.

Figure 2:
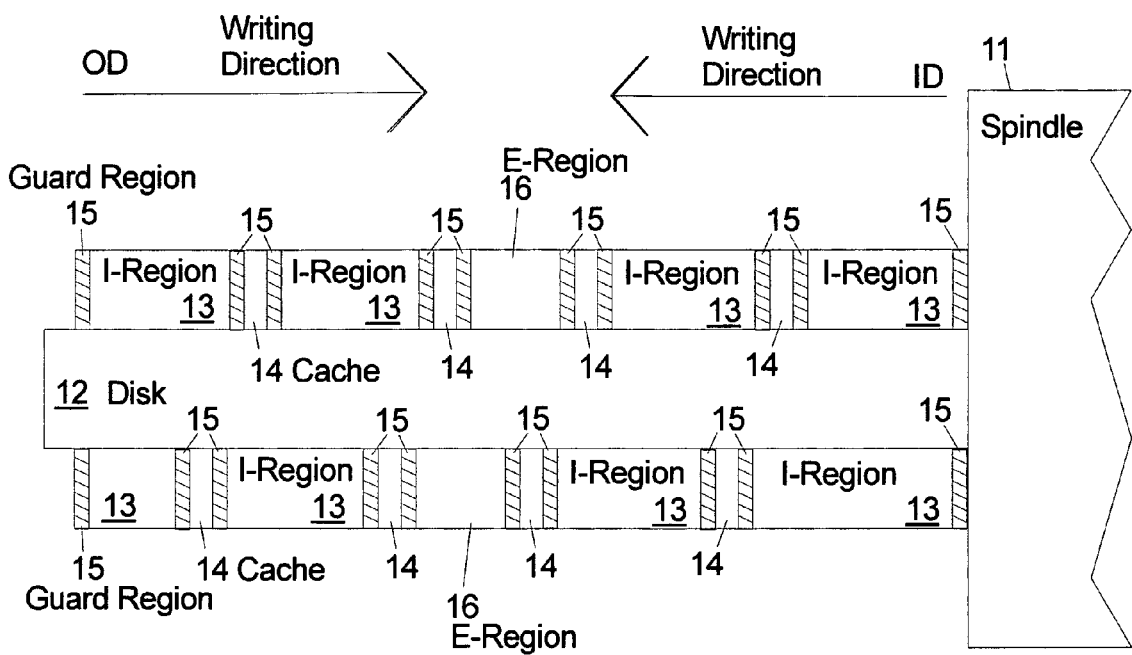
FIG. 2 is an illustration of a section view through the center of a disk in a data storage device with interspersed cache regions and shingled data regions according to an embodiment the invention where the regions are offset on different disk surfaces.

FIG. 2 is an illustration of a cutaway view of a disk in a data storage device with interspersed cache regions 14 and shingled data regions 13 according to an embodiment the invention where the regions are offset or staggered at different radii on different disk surfaces. The staggered arrangement for the cache regions can also be extended through any number of disks in the device. For example, if there are 3 disks mounted on the spindle, then the cache regions on the 6 surfaces could each be in a different position. This arrangement has the advantage of providing shorter seeks to the nearest available cache region even though it might be on a different disk surface than was currently being accessed. By performing a short seek and switching to the head on disk with the nearest cache region, the time required to write to the cache can be reduced. This configuration is also suited for use with symmetric heads. The direction of writing for this embodiment is the same as in FIG. 1, i.e., from OD to ID for the outer regions and ID to OD for the inner regions.

Figure 3:
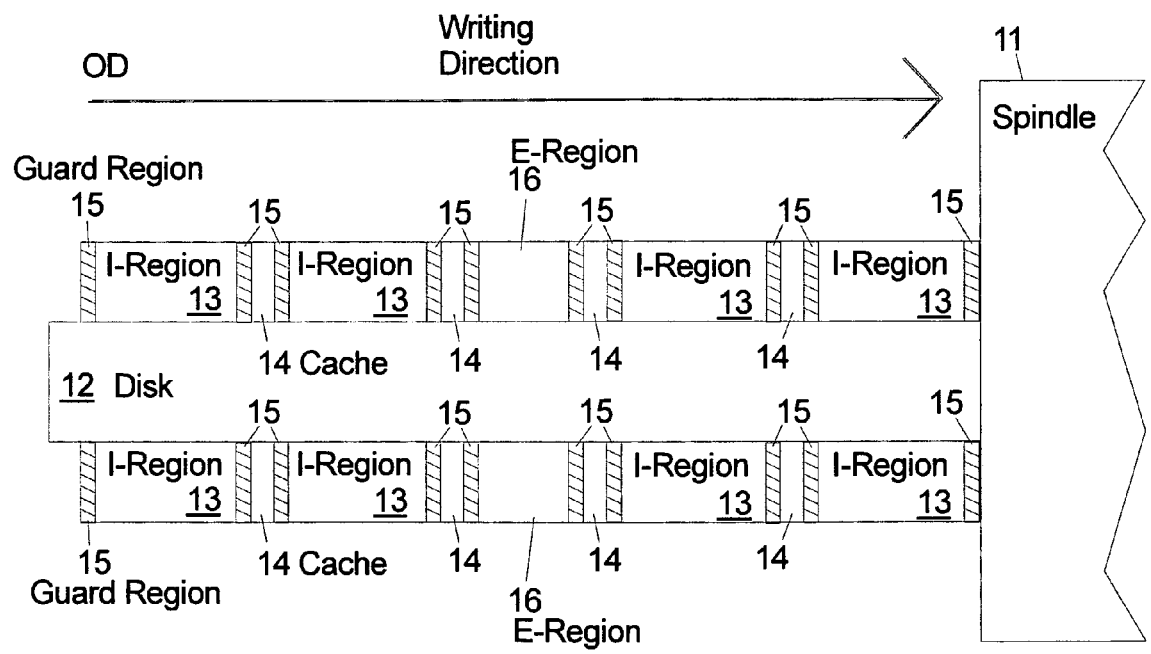
FIG. 3 is an illustration of a section view through the center of a disk in a data storage device with interspersed cache regions and shingled data regions according to an embodiment the invention where the writing direction is from OD to ID.

FIG. 3 is an illustration of a section view through the center of a disk in a data storage device with interspersed cache regions and shingled data regions according to an embodiment the invention where the shingled writing direction is from OD to ID. In another embodiment (not shown) the shingled writing direction is from ID to OD. The embodiments with unidirectional shingled writing can be used with a write head that is asymmetrical and allows shingled writing in only one direction because of sharp corner of write head on one side. Depending on the particular head design the direction of write is from either ID to OD or OD to ID.

Even though the cache tracks are unshingled and, therefore, wider than the data tracks, no special servo considerations are required for implementation in an SMR drive.

The cache regions according the invention can be used in a variety of flexible ways including in an implementation of write-twice caching and no particular caching algorithm is required. It is also possible for the device to use the cache regions when write caching is disabled for opportunistic temporary storage of data to improve performance.

In general, the cache regions according to the invention can be used to solve the data integrity problem inherent in write caching in RAM by temporarily writing the data to a cache track before signaling that the write has been executed. The device's firmware must keep track of the temporary writes and ultimately be able to retrieve the data from the cache track and write the data in a standard data track if required, for example, after a power loss interrupts the normal multistage writing sequence.

Figure 4:
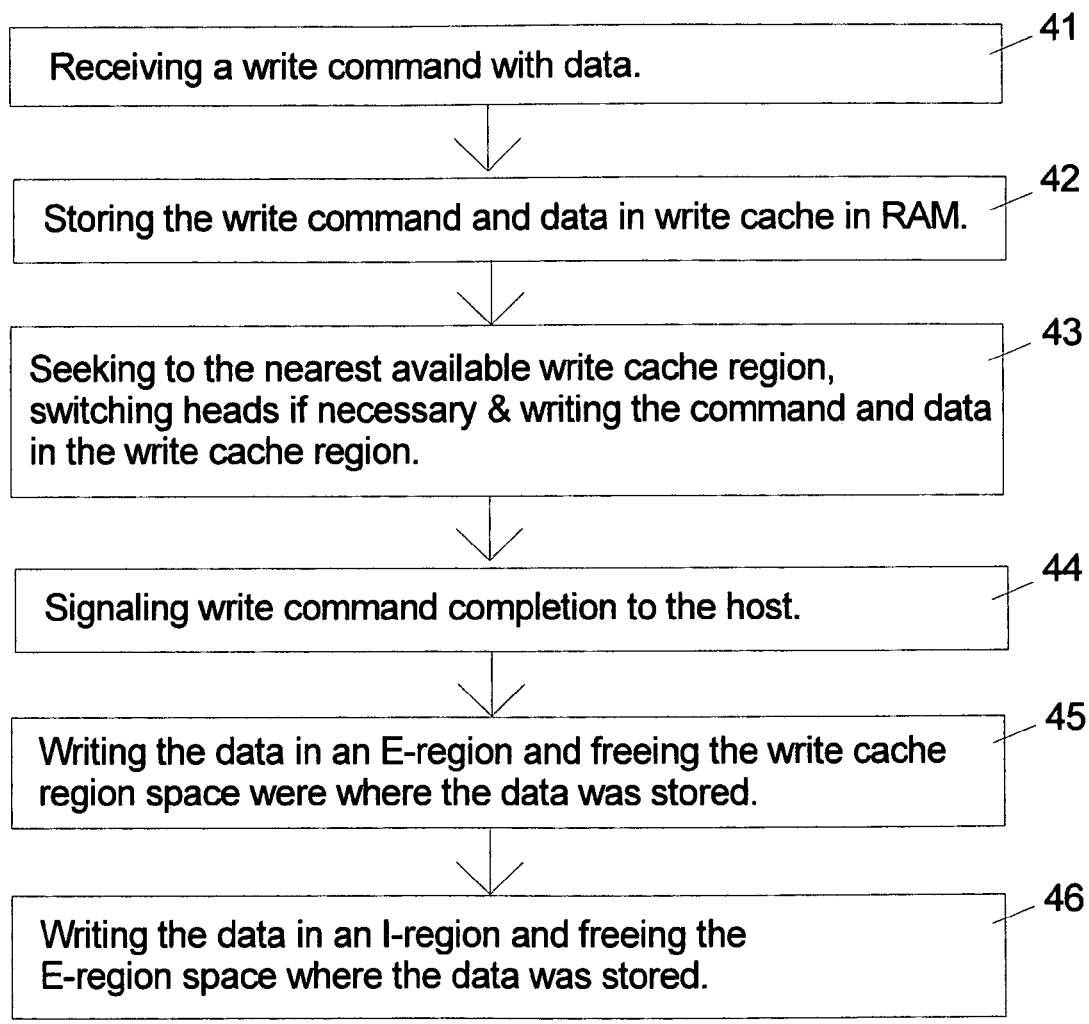
FIG. 4 is an illustration of a method of using the cache regions according to an embodiment the invention.

FIG. 4 is an illustration of a possible sequence of steps in a method of using the cache regions according to an embodiment the invention. The stages in executing a write command received from a host 41 in an SMR drive can include writing the command and data in the RAM cache 42, writing the command and data in a cache track on the disk 43, writing the command and data in an E-region on the disk 45, and finally writing the data in a shingled data I-region on the disk 46. However, some of these stages can skipped by the drive in some cases. Once the drive has written the command and data in a cache track, the data is safe from a power loss, so the host can be signaled that the write has been executed 44. As the data is written in successive stages of the process the space used to store to data in previous steps can be freed up. For example, the space RAM cache can optionally be freed up after the data is safely written to a write cache track on the media. Similarly, the write cache track can be freed up after the data has been stored in the E-region 45.

The drive is inherently a multitasking device which requires flexibility in resource utilization, so the sequence of operations given above is only one possibility and many other sequences are possible as the drive adapts to varying demands. One possible common sequence of operations would be to write data for multiple commands into the disk cache region so that the data is safe in the event of power loss, but leave the data in the RAM cache for efficient operation under normal conditions. When the drive decides to continue the process of writing the data to an E-region, as long as the data is still in RAM, there is no need to reread the data from the cache region on the disk. The data will ultimately be moved from the E-Region into an I-Region. Alternatively, if the write data has been deleted from the RAM cache, for example because the drive needed to free up space in the RAM, then the writing sequence would include retrieving the data from the cache region before writing it in the E-region.

While recognizing that no particular caching algorithm is required, the device can use the cache regions to help manage a plurality of pending write commands. For example, if the device is executing a series of sequential write operations and a nonsequential write command is received, it might seek to the nearest cache region to temporarily write the nonsequential data before resuming the sequential writes or some other operation. The device can also delay the temporary cache track write to extend or finish the current operation. In general, for bulk sequential writes, there may be no need to use the cache regions. However, the cache regions could be used for short-block, low queue-depth sequential writes when write caching is disabled to improve performance.

One alternative use for the cache regions is to use some of them, in effect, as permanent storage locations for data that is frequently written, i.e. hot data. Using this "hot cache" concept could reduce fragmentation and improve response time for these sectors. If the drive determines that a selected LBA has been frequently written, then it selects cache regions to serve as a hot cache for that LBA. The PBA in the selected cache region is recorded as the address for the selected LBA without writing the data selected LBA in an E-region. The cache PBA becomes the ultimate storage location for the LBA and the normal multistage writing process using the E-region and then I-region is not used.

One way to use the cache regions is as suggested in U.S. Pat. No. 6,378,037 to Hall (Apr. 23, 2002) modified for the SMR architecture. For example, the cache tracks can be used to store the write-cached data from RAM during idle time before finally writing the data to its ultimate disk location. Once a block from the write cache memory has been written to a cache track, that data can be removed from the write cache memory to free up RAM space. Later, the data can be read back from the cache track and written to the E-region and then to final destination in the shingled data areas of the media. Because the data in the cache tracks is nonvolatile, it can be recovered after a power interruption or a drive fault occurs.

The invention claimed is:

1. A storage device using magnetic recording disks comprising:
   a plurality of concentric shingled data I-regions on a first disk surface in which each shingled data I-region includes a set of partially overlapping data tracks that are written in sequence one after another;
   an E-region including a plurality of tracks on the first disk surface, the E-region containing data being staged prior to being written to an I-region; and
   a plurality of cache regions in concentric bands that are spaced at selected radial positions on the first disk surface interspersed between the shingled data I-regions, each cache region consisting of one or more unshingled tracks that do not overlap any other track, each of the plurality of cache regions including a smaller number of tracks than the E-region, and at least one of the cache regions containing data temporarily stored prior to being written to the E-region.

2. The storage device of claim 1 further comprising a plurality of guard bands that are at least one track wide and contain no user data and wherein one of the guard bands is positioned to separate one of the shingled data I-regions from an adjacent cache region.

3. The storage device of claim 2 further comprising a first write head mounted on a pivoting actuator that selectably positions the first write head over the first disk surface and wherein each of the guard bands has a width that is a first predetermined number of track widths.

4. The storage device of claim 1 wherein a first subset of the shingled data I-regions near an outer diameter of the disk surface are written in sequence from the outer diameter toward an inner diameter and a second subset of the shingled data regions near the inner diameter of the disk surface are written in sequence from the inner diameter toward an outer diameter.

5. A storage device using magnetic recording disks comprising:
   a plurality of concentric shingled data I-regions on a first disk surface in which each shingled data I-region includes a set of partially overlapping data tracks that are written in sequence one after another;
   an E-region including a plurality of tracks on the first disk surface, the E-region containing data being staged prior to being written to an I-region;
   a plurality of cache regions in concentric bands that are spaced at selected radial positions on the first disk surface interspersed between the shingled data I-regions, each cache region consisting of one or more unshingled tracks that do not overlap any other track, and at least one of the cache regions containing data temporarily stored prior to being written to the E-region; and
   a second disk surface mounted on a common spindle with the first disk surface and wherein the second disk surface includes:
   a plurality of concentric shingled data I-regions on the second disk surface in which each shingled data I-region includes a set of partially overlapping data tracks that are written in sequence one after another; and
   a plurality of cache regions in concentric bands that are spaced at predetermined radial positions on the second disk surface interspersed between the shingled data regions, the cache regions including a plurality of unshingled tracks that do not overlap any other track; and
   wherein the cache regions on the second disk surface are offset in staggered locations in relation to the cache regions on the first disk surface so that a first seeking distance from at least one selected track on the first disk to a nearest cache region on the second disk surface is less than a second seeking distance to a nearest cache region on the first disk surface.

6. The storage device of claim 1 wherein at least one cache region contains temporary write data used for write-twice caching.

7. The storage device of claim 1 wherein at least one cache region contains a hot cache of selected user data that is frequently changed.

8. The storage device of claim 1 wherein the E-region includes shingled data tracks that are written in sequence one after another.

9. The storage device of claim 1 wherein the E-region includes unshingled data tracks that do not overlap adjacent tracks.

* * * * *